(12) United States Patent
Markgraf

(10) Patent No.: US 9,214,656 B2
(45) Date of Patent: Dec. 15, 2015

(54) BATTERY ADAPTER FOR A NIGHT VISION DEVICE

(71) Applicant: Deryl E. Markgraf, Colleyville, TX (US)

(72) Inventor: Deryl E. Markgraf, Colleyville, TX (US)

( * ) Notice: Subject to any disclaimer, the term of this patent is extended or adjusted under 35 U.S.C. 154(b) by 176 days.

(21) Appl. No.: 14/195,056

(22) Filed: Mar. 3, 2014

(65) Prior Publication Data

US 2015/0249236 A1  Sep. 3, 2015

(51) Int. Cl.
*H01M 2/20* (2006.01)
*H01M 2/10* (2006.01)

(52) U.S. Cl.
CPC ........ *H01M 2/1033* (2013.01); *H01M 2220/30* (2013.01)

(58) Field of Classification Search
CPC .. H01M 2/20; H01M 2/1033; H01M 2220/30
See application file for complete search history.

*Primary Examiner* — Helen O Conley

(57) ABSTRACT

My invention relates to an improvement in the constant and extended supply of electrical power to night vision devices and the convenience of making use of a standardized, commonly available battery with higher reserve power for the same. Specifically, my invention provides an adapter that is placed into the battery compartment of an NVD, is securely fixed in that compartment so as to maintain electrical connectivity regardless of jarring forces it may endure, and contains a port into which the wire lead from an external power pack is plugged so as to provide the electrical power. The external power pack can be configured to hold the battery or batteries of choice, and can be made to attach either to the user's person or the same object that the NVD is attached to, such as a rifle. The external power pack will allow the use of batteries with a higher reserve power, or batteries that are rechargeable/reusable, and supports the user not having to carry a multitude of differing batteries in order to have spare power available for several different devices.

7 Claims, 3 Drawing Sheets

BATTERY ADAPTER FOR A NIGHT VISION DEVICE

CROSS REFERENCE TO RELATED APPLICATIONS

Not applicable

BACKGROUND OF THE INVENTION

My invention relates to improvements in the performance, reliability and operation of battery powered devices, in particular battery powered night vision devices.

A night vision device (NVD), also frequently referred to as an 'image enhancement device', is an optical instrument that allows images to be produced in levels of light approaching total darkness. Often used by the military and law enforcement agencies, NVD's are also available to civilian users. Night vision devices were first used in World War II, and came into wide use during the Vietnam War. The technology has evolved greatly since their introduction, leading to several "generations" of night vision equipment, each having a higher performance and lower price than their predecessor.

Night-vision equipment can be split into three broad categories, any of which can also include a telescopic lens in addition to night vision capability:
1—Scopes—Normally handheld or mounted on a weapon, scopes are monocular (one eye-piece).
2—Goggles—Typically worn on the head, but can be handheld, binoculars have two eye-pieces.
3—Cameras—Most often permanently mounted wherever night vision is desired, such as around a building or property. The military mounts night vision cameras on some helicopters and other mobile equipment. Newer hand held camcorders may have night vision built right in.

Typical uses of night vision devices today include:
Military
Law enforcement
Hunting
Wildlife observation
Surveillance
Security
Navigation
Hidden-object detection The original purpose of night vision was to locate enemy targets at night. It is still used extensively by the military for that purpose, as well as for navigation, surveillance and targeting. Police and security often use both thermal-imaging and image-enhancement technology, particularly for surveillance. Hunters and nature enthusiasts use NVDs to maneuver outdoors at night. Many businesses have permanently-mounted cameras equipped with night vision to monitor their property and surroundings.

In reviewing this list of applications, it's evident that many involve the need for consistently high performing equipment and fool proof reliability while in operation. In other words, a failure of the equipment to deliver the enhanced images as it was designed to do, whether that failure is permanent, intermittent or even momentary, can have a big impact. A malfunction can result in something as frustrating as losing track of whatever the user was viewing, or more significantly it can result in the endangerment of property or even the safety of human life.

Enabling components of image enhancement devices start with a conventional lens, called the objective lens, which captures ambient light and some near-infrared light. The gathered light is sent to an image-intensifier tube that collects and amplifies the infrared and visible light. The result is the presentation of an image that is enhanced, and made more visible to the human eye.

The image-intensifier tube requires a power source in order to perform this amplification. In most NVDs, the power supply for the image-intensifier tube comes from small batteries such as two N-Cell or two "AA" batteries. The tube outputs a high voltage, about 5,000 volts, to the image-tube components.

The challenges of a well-designed, high performance night vision device come about as a result of how it receives the necessary electrical power to perform in combination with the conditions under which it is used. In reviewing the aforementioned list of typical uses, it can be envisioned that any in the list might involve an individual physically carrying an NVD while they are traversing through rugged terrain under extreme conditions. This will undoubtedly result in the NVD itself receiving rough treatment. The most extreme shock an NVD may experience may be that from the recoil of a rifle that it is mounted on.

The most frequently encountered problem with the proper functioning on an NVD is loss of power. When an NVD is initially turned on, it experiences a lengthy 'boot up' cycle before which the image enhancement function is operational. Losing power results in having to go through this lengthy 'reboot' of the device, during which time the image enhancement feature is not available. The original purpose of using the NVD is then not achieved because the visible detection of whatever was being focused on is lost, and the target is able to move on without detection. This loss of power can be as a result of having to change the battery due to its low charge level or it can be from the batteries being knocked about (such as from the recoil of a rifle being shot) and losing electrical continuity within the device.

Another issue of importance in NVD design for units that are not directly mounted to a building, structure or vehicle, is the overall weight of the assembly, including batteries. Having less weight to carry around is a significant issue when one is carrying and using the NVD for extended time periods, which can be the case for night vision goggles or a night vision scope mounted on a rifle, for example.

Another concern of NVD users is the battery itself. Batteries have a limited source of reserve power, can be costly, and can come in a vast variety of shapes, sizes and voltages. It is desirable to make use of a battery that has a maximum rated life span while still being portable, and standardize on as few different battery specifications (i.e. shape, size, voltage) as can be, as it is much more convenient to supply oneself with a single type of battery that is readily available, sold in bulk at a reduced price, and that can power more than 1 device. This can mean that a user does not necessarily have to carry a different set of spare batteries for each and every device they own. Rather, they can carry fewer spares, and swap out batteries only in the device(s) that may lose power during their outing.

What is required in the field of night vision devices is a design that—
  ensures there is no interruption, even momentarily, in the supply of battery power once the unit is turned on, until such point as the operator deliberately turns the unit off,
  maximizes the available contact surface between the power source and the device to ensure the flow of electrical power is constant and consistent,
  supports the ability to utilize a source of battery power that has a maximum amount of reserve charge,
  allows the option to minimize the overall weight of the night vision device/assembly, lets the owner of several devices standardize on the batteries necessary to purchase, supports the use of rechargeable/reusable batteries, allows fewer spare batteries to be carried by the owner during use.

None of the prior art discloses or addresses all of these issues which are resolved by my invention, nor do they afford the benefits specifically designed into my invention.

For example,

Hankel, et al. U.S. Pat. No. 7,417,403 discloses a device that allows a user to use a smaller battery within the battery compartment of a set of night vision goggles, while at the same time retaining the use of the original product's battery compartment cap and allowing use of the original sized battery if the user so desires, perhaps to maximize resale value of the device. The focus is on allowing the user to select a more commonly available battery size. Given that the invention reduces the size of the battery compartment it is not seen that a significantly longer battery life is achieved with the use of smaller form factor batteries. While Hankel, et al. speaks to reducing the overall weight of the device (including batteries), because of the added weight of the invention itself, and the relatively small difference in battery size feasible for use, the weight savings appear to be negligible. Neither is there any claim to improvements made in the performance of maintaining constant electrical continuity under adverse conditions (i.e. recoil from a rifle being shot), rather Hankel et al presents a design that makes use of the original electrical contact points inherent in the device as delivered from the manufacturer.

Maeshima, et al. U.S. Pat. No. 5,805,440 discloses a device that incorporates an adapter for a battery compartment, but it is made to accommodate the powering of the device by AC current which first passes through a converter to change it to the appropriate DC current.

Cornog, et al.—20030090162 presents a design that allows remote positioning of battery packs that are connected to a portable power tool. No claim is made in the design to any improvement made toward maintaining constant electrical continuity under adverse conditions (i.e. recoil from a rifle being shot), nor the use of different batteries having a longer life.

My invention enables anyone who owns a night vision device to be assured that there will be no interruption in the supply of electrical power once the power to the device has been switched on, to use a longer life battery, to enjoy the benefits/features available from a commonly found and standardized battery source across the owner's other battery powered devices, to minimize expenses through the use of rechargeable/reusable batteries, and gives them the option of relocating the power source to realize a weight reduction in the entire assembly being carried.

BRIEF SUMMARY OF THE INVENTION

My invention relates to an improvement in the constant and extended supply of electrical power to night vision devices and the convenience of making use of a standardized, commonly available battery for the same. Specifically, my invention provides an adapter that is placed into the battery compartment of an NVD, is securely fixed in the compartment so as to maintain electrical connectivity regardless of any jarring forces it may endure, and contains a port into which the wire lead from an external power pack is plugged so as to provide the electrical power. The external power pack can be configured to hold the battery or batteries of choice, and can be made to attach either to the user's clothing or body or the same object that the NVD is attached to, such as a rifle.

An object of the present invention is to prevent the loss of power to an NVD when it experiences shaking forces such as the recoil of a rifle being shot, or other rough handling by the user Another object of the present invention is to allow the use of battery power that has a longer reserve of power than what the device was originally designed for.

Another object of the present invention is to have the option to minimize the weight of the night vision device being carried or used by relocating the batteries, which are typically a significant percentage of the overall assembly weight, remote from the device and rather attach them to the user's belt or clothing with an included clip or loop or through the use of an attaching strap so as to be supported by the user's main body and not by their hands/arms which are necessary to position and steady the NVD while it is in use.

Another object of the present invention is to allow the user to make use of a different battery than what the device was designed for, whether for purposes of a longer life, the standardization of batteries used across other devices the owner may have, or economic reasons from a less expensive or rechargeable/reusable battery.

Another object of the present invention is to maintain the portability/usability of an NVD after the application of a longer life power source.

DETAILED DESCRIPTION OF THE INVENTION

Figure 1:
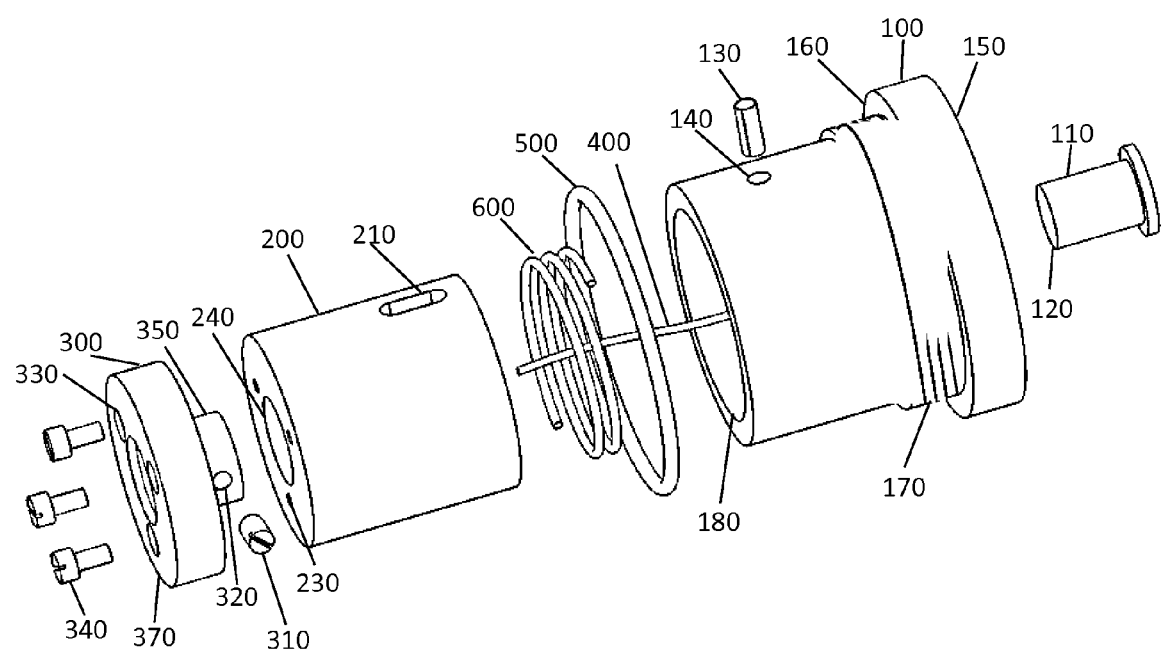
FIG. 1 shows an exploded view of all components for the preferred embodiment of the invention.
Figure 2:
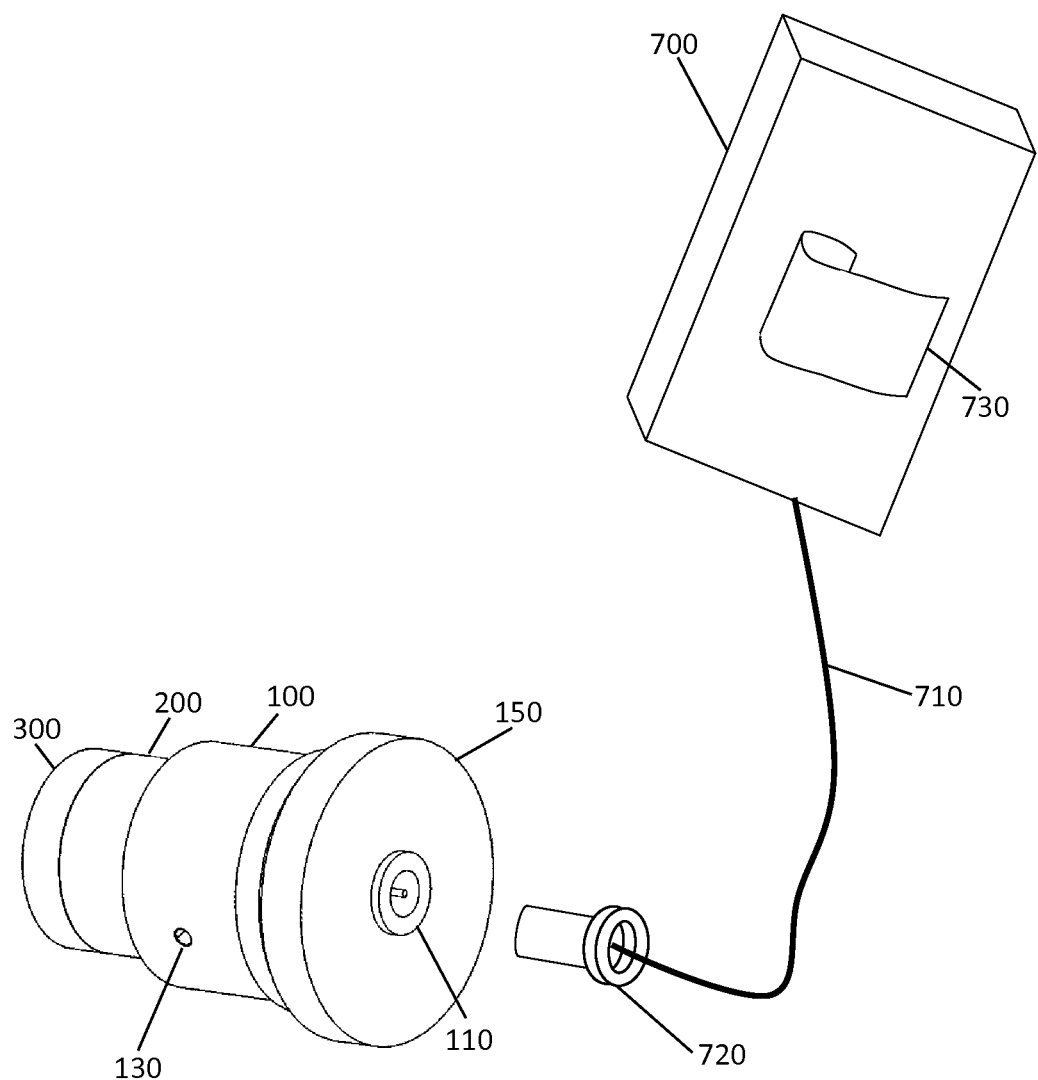
FIG. 2 shows an assembled view of the preferred embodiment of the invention.
Figure 3:
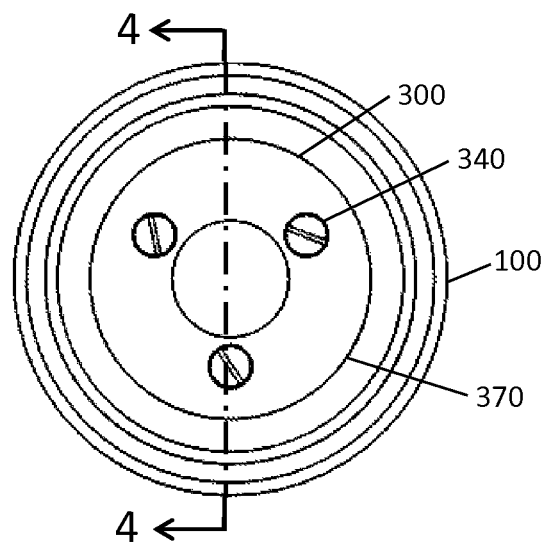
FIG. 3 shows an end view of the preferred embodiment of the invention, illustrating the increased electrical contact surface area.
Figure 4:
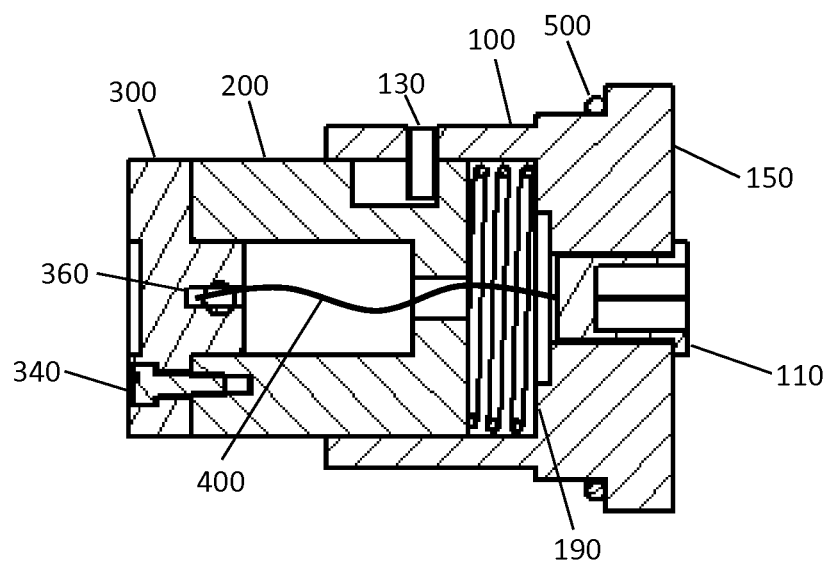
FIG. 4 shows a section view of the preferred embodiment of the invention.

In its preferred embodiment, my invention consists of an outer portion 100 that has an inner cavity 180 into which a sliding inner portion 200 and a spring 600 are concentrically inserted. The outer portion 100 is prepared with a hole on the exposed end 150 that is presented when the entire assembly is placed into the battery compartment of the NVD. This hole accepts an industry standard electrical connector 110 such as a 2.1 mm DC plug. The outer portion 100 is also fitted with a hole 140 into which a pin 130 (such as a roll pin) is inserted. A seal 500 such as an o-ring is concentrically placed over the threaded portion 170 and makes a weather tight seal between surface 160 and the mating surface on the battery compartment of the night vision device.

A wire 400 is connected to the contact surface 120 of the industry standard electrical connector 110 so there is electrical continuity between them. This wire 400 then passes through the approximate middle of the spring 600 and the inner clearance core 240, and lastly enters the internal bore 360 of the end portion 300 where-in it is held in place by set screw 310 which is inserted into threaded bore 320. This provides electrical continuity between the wire 400 and the extended contact surface 370 as end portion 300 is made of material that conducts electricity. As a result there is electrical continuity between the industry standard electrical connector 110 and the extended contact surface 370.

Sliding inner portion 200 is not made of material that is electrically conductive, but rather is constructed of a material that supports smooth uninhibited sliding within the inner cavity 180 of outer portion 100.

End portion 300 is secured to sliding inner portion 200 with fasteners 340 passing through clearance holes 330 and threading into threaded bores 230, and is held in line concentrically with sliding inner portion 200 by its small end 350 fitting into inner clearance core 240 of sliding inner portion 200.

Spring 600 is compressed between base surface 190 of outer portion 100 and sliding inner portion 200. Inner portion 200 is allowed to travel through a distance determined by pin 130 positioned in slot 210. Thus as spring 600 extends and moves sliding inner portion 200 away from base surface 190, the entire battery adapter assembly is prohibited from being inadvertently disassembled. The removal of pin 130 from hole 140 facilitates the disassembly of components when desired.

Spring 600 is of sufficient strength to provide a constant pressure/force between extended contact surface 370 and the mating electrical contacts within the NVD's battery compartment thereby maintaining electrical continuity to supply power to the NVD.

External power pack 700 is made to contain batteries chosen by the user, and to transfer the electrical power from those batteries through connecting wire 710 of which end 720 is used to secure the connection and electrical continuity with the industry standard electrical connector 110. External power pack 700 also has an attachment means 730 by which a person can fasten it to a support structure such as their belt, an upper arm, or a rifle upon which the powered night vision device is mounted.

In the preferred embodiment the battery adapter (specifically the outer portion 100 and end portion 300) is made from light weight material that conducts electricity such as aluminum. Sliding inner portion 200 is to be made of a material that easily slides against the inner cavity 180 of outer portion 100, such as a plastic or Teflon.

External power pack 700 can be made of a combination of plastic and canvas or waterproof material such as Gore-Tex, such that a rigid inner compartment secures the contained batteries, and the other surface is softer to the touch, non-scratching and weather proof.

It is to be understood that beyond the herein described preferred embodiment of my invention, presented here as an illustration for understanding in general terms the benefits, characteristics and advantages its design affords, further embodiments or details are claimed to be protected as well as they fall within the scope and spirit of the broad wording and understanding of the claims herein attached.

I claim:

1. A battery adapter device for a night vision device that is of a shape and size to compressively fit within the battery compartment of said night vision device, consisting of:

An outer portion 100
   A sliding inner portion 200
   An end portion 300
   said outer portion 100 accommodating an industry standard electrical connector 110 inserted into exposed end 150, a seal 500 that is located between surface 160 and said battery compartment, a threaded portion 170 matching threads in said battery compartment, a pin 130 inserted into hole 140, an inner cavity 180, a base surface 190 and said sliding inner portion 200 accommodating a slot 210 into which said pin 130 extends in a fashion to limit the sliding and rotational motion of said sliding inner portion 200, an inner clearance core 240 through which wire 400 extends, threaded bores 230 to accommodate fasteners 340, and said end portion 300 having a small end 350 that inserts into said inner clearance core 240, an internal bore 360 into which said wire 400 is placed, a threaded bore 320 to accommodate a set screw 310 which secures said wire 400 in said internal bore 360, clearance holes 330 to accommodate said fasteners 340 which provide securement of said end portion 300 to said sliding inner portion 200, an extended contact surface 370 and a spring 600 which concentrically inserts into said inner cavity 180 between said base surface 190 and said sliding inner portion 200 which is likewise concentrically inserted into said inner cavity 180 and said wire 400 connects to contact surface 120, passes through said inner clearance core 240 into said internal bore 360 where it is secured by said set screw 310 and an external power pack 700, including a connecting wire 710 with end 720 and attachment means 730, where said end 720 connects to said industry standard electrical connector 110 such that electrical power from said external power pack 700 is transferred through said industry standard electrical connector 110 then said wire 400 then end portion 300 and finally said extended contact surface 370.

2. The said battery adapter device described in claim 1 where said spring 600 provides sufficient expansive force on said sliding inner portion 200 so as to secure said battery adapter device within said battery compartment of said night vision device against any movement and subsequent loss of electrical contact between said extended contact surface 370 and said night vision device.

3. The said battery adapter device described in claim 1 where the positioning of said pin 130 inside said slot 210 provides stop limits for the sliding and/or rotational movement of said sliding inner portion 200 within said inner cavity 180 in order to hold the said battery adapter device together against said expansive force of said spring 600 on said sliding inner portion 200.

4. The said battery adapter device described in claim 1 where said attachment means 730 is a belt clip that allows the user to attach said external power pack 700 to themselves.

5. The said battery adapter device described in claim 1 where said attachment means 730 is a loop that allows the user to attach said external power pack 700 to a rifle, their upper arm or any other structure by the use of a strap with buckle or a length of Velcro.

6. The said battery adapter device described in claim 1 where said attachment means 730 contains a hole that allows the user to attach said external power pack 700 to a supporting device by using a fastener.

7. The said battery adapter device described in claim 1 where said external power pack 700 accommodates batteries of a longer reserve power that are commonly sourced and can be standardized by the user of said battery adapter device to power several night vision devices.

* * * * *